United States Patent
Cheng et al.

(10) Patent No.: US 11,799,378 B1
(45) Date of Patent: Oct. 24, 2023

(54) MULTIPHASE SERIES CAPACITOR DC-DC CONVERTER AND CONTROL METHOD

(71) Applicant: HEFEI CLT MICROELECTRONICS CO. LTD, Anhui (CN)

(72) Inventors: Lin Cheng, Anhui (CN); Feng Wu, Anhui (CN); Jingyi Yuan, Anhui (CN); Zeguo Liu, Anhui (CN)

(73) Assignee: HEFEI CLT MICROELECTRONICS CO. LTD, Hefei (CN)

( * ) Notice: Subject to any disclaimer, the term of this patent is extended or adjusted under 35 U.S.C. 154(b) by 0 days.

(21) Appl. No.: 18/329,511

(22) Filed: Jun. 5, 2023

Related U.S. Application Data

(63) Continuation of application No. PCT/CN2021/103772, filed on Jun. 30, 2021.

(51) Int. Cl.
*H02M 3/158* (2006.01)
*H02M 3/156* (2006.01)
(Continued)

(52) U.S. Cl.
CPC ....... *H02M 3/1586* (2021.05); *H02M 1/0019* (2021.05); *H02M 1/0845* (2013.01);
(Continued)

(58) Field of Classification Search
CPC ..... H02M 3/156; H02M 3/158; H02M 3/1584
See application file for complete search history.

(56) References Cited

U.S. PATENT DOCUMENTS

| 6,188,209 B1 | 2/2001 | Poon et al. | |
| 6,943,535 B1 * | 9/2005 | Schiff | H02M 3/1584 |
| | | | 323/244 |

(Continued)

FOREIGN PATENT DOCUMENTS

| CN | 1363136 A | 8/2002 |
| CN | 111245236 A | 6/2020 |
| TW | I649951 B | 2/2019 |

OTHER PUBLICATIONS

ISA State Intellectual Property Office of the People's Republic of China, International Search Report Issued in Application No. PCT/CN2021/103772, dated Mar. 2, 2022, WIPO, 4 pages.

(Continued)

*Primary Examiner* — Gary A Nash
(74) *Attorney, Agent, or Firm* — McCoy Russell LLP

(57) ABSTRACT

Multiphase series capacitor DC-DC converters are provided, including: a power stage circuit configured to convert an input DC voltage into a stable DC voltage required by a load, where the power stage circuit includes inductors of two or more phases, and there is a phase difference with a preset interval between inductor currents of phases for alternately charging the load in sequence, and a bidirectional switch is provided between inductors of every two adjacent phases, where when the bidirectional switch is turned on, the inductors of the corresponding two phases charge the load simultaneously; and a load transient response circuit configured to, when a load transient positive step occurs, control one or more bidirectional switches to be turned on to make inductors of two or more corresponding phases charge the load simultaneously. Control methods of such converters are also provided, which can realize fast response to load transient changes.

10 Claims, 4 Drawing Sheets

(51) Int. Cl.
*H02M 1/084* (2006.01)
*H02M 1/00* (2006.01)
*H02M 3/157* (2006.01)

(52) U.S. Cl.
CPC ............ *H02M 3/157* (2013.01); *H02M 3/156* (2013.01); *H02M 3/158* (2013.01); *H02M 3/1584* (2013.01)

(56) References Cited

U.S. PATENT DOCUMENTS

| | | | |
|---|---|---|---|
| 10,211,735 B1 | 2/2019 | Chen et al. | |
| 10,673,328 B2 * | 6/2020 | Bari | H02M 3/156 |
| 2007/0069705 A1 * | 3/2007 | Umminger | H02M 3/1588 |
| | | | 323/282 |
| 2008/0238378 A1 * | 10/2008 | Uan-Zo-Li | H02M 3/1584 |
| | | | 323/249 |
| 2010/0141222 A1 * | 6/2010 | Ouyang | H02M 3/158 |
| | | | 323/234 |
| 2015/0311831 A1 * | 10/2015 | Yamada | H02J 7/0063 |
| | | | 307/82 |
| 2016/0294182 A1 * | 10/2016 | Li | H02M 3/158 |
| 2018/0013348 A1 | 1/2018 | Paul et al. | |

OTHER PUBLICATIONS

ISA State Intellectual Property Office of the People's Republic of China, Written Opinion of the International Searching Authority Issued in Application No. PCT/CN2021/103772, dated Mar. 2, 2022, WIPO, 5 pages (Submitted with Machine/Partial Translation).

\* cited by examiner

MULTIPHASE SERIES CAPACITOR DC-DC CONVERTER AND CONTROL METHOD

CROSS-REFERENCE TO RELATED APPLICATION

The present application is a U.S. Continuation Application of International Application No. PCT/CN2021/103772 filed on Jun. 30, 2021, the entire content of which is incorporated herein by reference for all purposes.

TECHNICAL FIELD

The present disclosure relates to electronic technologies, and in particular relates to multiphase series capacitor DC-DC converters and control methods.

BACKGROUND

Available multiphase series capacitor direct current to direct current (DC-DC) converters are optimized for a control loop thereof in usual to improve a load transient response speed, but the load transient response speed is still limited by a rising slope of an inductor current. Conventional transient enhancement techniques increase the rising slope of the inductor current by increasing switching frequency. However, the increase in the switching frequency further compresses on-time of power transistors, which poses a high challenge to design of both control circuits and drive circuits. The increase in switching frequency increases switching loss of the power transistors and deteriorates conversion efficiency. In order to avoid overlapping on-time of power transistors of multiple phases, control signals to the power transistors have to be maintained a fixed phase difference of 360°/N, which makes it impossible to use N phase inductor currents simultaneously charging a load, and limits improvement of the load transient response speed.

SUMMARY

According to an aspect of the present disclosure, there is provided a multiphase series capacitor direct current to direct current (DC-DC) converter, which includes: a power stage circuit configured to convert an input direct-current (DC) voltage into a stable DC voltage required by a load, where the power stage circuit includes inductors of two or more phases, and there is a phase difference with a preset interval between inductor currents of phases for alternately charging the load in sequence, and a bidirectional switch is provided between inductors of every two adjacent phases, where when the bidirectional switch is turned on, the inductors of the corresponding two phases charge the load at the same time; and a load transient response circuit configured to, when a load transient positive step occurs, control one or more bidirectional switches to be turned on to make inductors of two or more corresponding phases charge the load at the same time, so as to respond to the transient step of the load fast.

Optionally, the load transient response circuit includes: an error amplifier configured to calculate an error between an output voltage of the power stage circuit and a reference voltage to obtain an error signal; a transient detecting circuit configured to determine whether the load transient positive step occurs based on the error signal; a transient enhancement logic circuit configured to, when the occurrence of the load transient positive step is detected, generate one or more control signals for controlling the one or more bidirectional switches to be turned on and a drive circuit configured to control the one or more bidirectional switches to be turned on based on the one or more control signals.

Optionally, when the load transient positive step occurs, inductors of two phases connected with the one or more turned-on bidirectional switches are connected in parallel after the one or more bidirectional switches are turned on.

Optionally, the load transient response circuit further includes: an on-time generating circuit configured to generate control signals for power transistors on circuits where the inductors of phases are located based on the error signal, where each of the control signals is for controlling conduction of a circuit where the inductor of each phase is located to make the inductor of each phase charges the load alternately in sequence; where the drive circuit is further configured to, when no load transient positive step occurs, control power switches provided on the circuits where the inductors of phases are located to be turned-on and turned-off according to the control signals of phases, to make the inductor of each phase charge the load alternately in sequence.

Optionally, a sub-circuit where an inductor of at least one phase is located in the power stage circuit includes: a power switch AH, a power switch AL and a filter inductor $L_b$, which are connected in sequence; and a sub-circuit where an inductor of at least one other phase adjacent to the inductor is located includes: a power switch BH, a capacitor $C_F$, a power switch BL and a filter inductor $L_a$, which are connected in sequence, where input terminals of the power switch AH and the capacitor $C_F$ are both connected to the power switch BH, the power switches BH and AH are for controlling voltage inputs of corresponding sub-circuits, respectively; output terminals of the filter inductor $L_b$ and the filter inductor $L_a$ are both connected to an output port of the power stage circuit; the bidirectional switch is provided between input terminals of the filter inductor $L_b$ and the filter inductor $L_a$; and a grounded filter capacitor C is provided at the output port of the power stage circuit.

Optionally, after the load transient positive step occurs, the drive circuit is further configured to turn off the power switches BL, AH, and AL on two-phase sub-circuits connected with one or more turned-on bidirectional switches, and to drive the power switch BH to generate voltage input pulses in response to the load transient positive step.

According to another aspect of the present disclosure, there is provided a control method, applied to the multiphase series capacitor DC-DC converter according to the first aspect, including: controlling, when the occurrence of the transient positive step of the load is detected, the one or more bidirectional switches between inductors of two or more adjacent phases in the power stage circuit to be turned on, to make the inductors of the two or more adjacent phases charge the load at the same time, so as to respond to a transient change of the load fast.

Optionally, the method further includes: when the load works normally, controlling the one or more bidirectional switches to be turned off and controlling the inductor of each phase to alternately charge the load in sequence.

Optionally, when the occurrence of the transient positive step of the load is detected, the method further includes: turning off the power switches BL, AH and AL located on two-phases sub-circuits connected with the one or more turned-on bidirectional switches in the power stage circuit, and driving the power switch BH to generate voltage input pulses in response to the load transient positive step.

Optionally, when the occurrence of the transient positive step of the load is detected, controlling the one or more bidirectional switches between the inductors of the two or more adjacent phases in the power stage circuit to be turned on includes: obtaining an error signal by calculating an error between an output voltage of the power stage circuit and a reference voltage; determining whether the load transient positive step occurs based on the error signal; when the occurrence of the transient positive step of the load is detected, generating one or more control signals for controlling the one or more bidirectional switches to be turned on; and controlling the one or more bidirectional switches to be turned on based on the one or more control signals.

The above one or more technical solutions according to the embodiments of the present disclosure may achieve the following beneficial effects.

The multiphase series capacitor DC-DC converter and its control method provided by the present disclosure may remove a phase interleaved clock of a two-phase structure, eliminate a delay time caused by phase interleaving, use inductors of two phases to charge a load at the same time, in this way, a rising slope of an inductor current is at least doubled, and the load transient response speed is improved significantly.

DETAILED DESCRIPTION OF THE EMBODIMENTS

Figure 1:
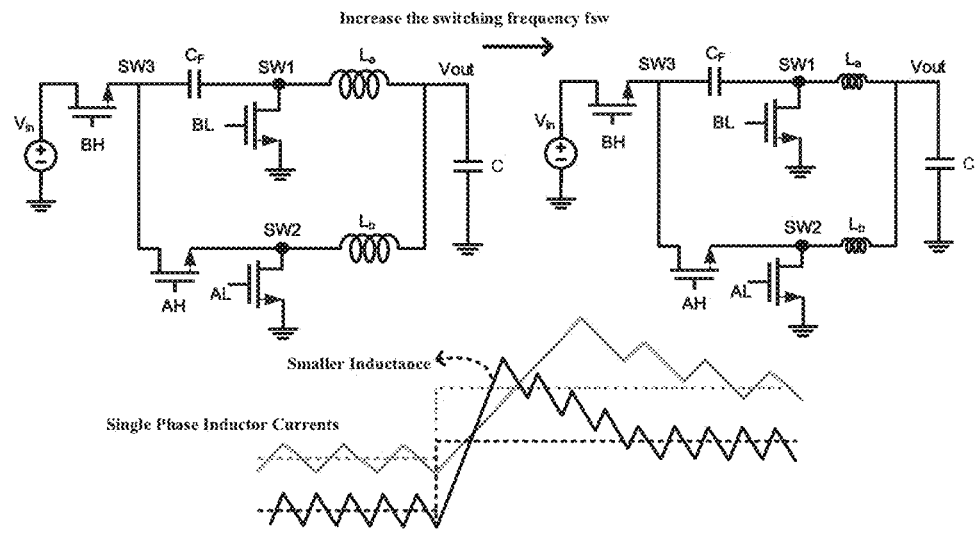
FIG. 1 is a schematic circuit diagram illustrating a conventional two-phase series capacitor DC-DC converter.

Embodiments of the present disclosure will be described with reference to the drawings below. It should be understood, however, that these descriptions are illustrative only, and are not intended to limit the scope of the present disclosure. In addition, in the following description, descriptions of known structures and techniques are omitted to avoid unnecessarily obscuring the concept of the present disclosure.

Terms used in the present disclosure are for the purpose of describing particular embodiments only, and are not intended to be limiting of the present disclosure. The words "a", "an" and "the" used in the present disclosure should also be understood as including the plural meanings of "plurality" and "multiple", unless the context clearly indicates otherwise. In addition, the terms "including", "comprising" and the like used herein indicate the existence of a feature, a step, an operation and/or a component, but do not exclude the existence or addition of one or more other features, steps, operations or components.

All terms (including technical terms and scientific terms) used in the present disclosure have the meanings commonly understood by those skilled in the art, unless otherwise defined. It should be noted that the terms used in the present disclosure should be interpreted to have meanings consistent with the context of this specification, and should not be interpreted in an idealized or overly rigid manner.

Some block diagrams and/or flowcharts are shown in the drawings. It should be understood that some or combinations of blocks in the block diagrams and/or flowcharts can be implemented by computer program instructions. These computer program instructions may be provided to one or more processors of a general-purpose computer, a specialized computer, or another programmable data processing device, so that when executed by the one or more processors, these instructions may make one or more devices for implementing the functions/operations described in these block diagrams and/or flowcharts.

Therefore, the technical solutions in the present disclosure can be implemented in the form of hardware and/or software (including firmware, microcode and so on). In addition, the technical solutions in the present disclosure may take the form of a computer program product on a computer-readable medium storing instructions, which can be used by an instruction execution system or in combination with an instruction execution system. In the context of the present disclosure, a computer-readable medium may be any medium that can contain, store, convey, propagate or transport instructions. For example, a computer-readable medium may include, but is not limited to, an electrical, magnetic, optical, electromagnetic, infrared, or semiconductor system, apparatus, device, or propagation medium. Specific examples of the computer-readable medium may include: a magnetic storage apparatus, such as a magnetic tape or a Hard Disk Drive (HDD); an optical storage apparatus, such as a Compact Disk Read Only Memory (CD-ROM); a memory, such as a Random Access Memory (RAM) or a flash memory; and/or a wired/wireless communication link.

For a conventional Buck DC-DC converter, a slope m and a ripple $\Delta i_L$ of an inductor current can be expressed as:

$$m = (V_{in} - V_{out})/L \qquad (1)$$

$$\Delta i_L = m \times DT \qquad (2)$$

$V_{in}$ represents an input voltage of the converter, $V_{out}$ represents an output voltage of the converter, L represents an inductance value, D represents a duty cycle of a power transistor control signal, $D = V_{out}/V_{in}$, $D<1$, T represents a switching period of the converter, and DT represents the ON time of power transistor per period. According to formula (1), the slope of the inductor current is inversely proportional to the inductance value. The slope of the inductor current represents a current capability of the inductor to charge a load when a transient step (instant change) of the load occurs. The larger the slope, the larger a charging current to the load, the faster a recovery speed of the output voltage, the smaller a voltage drop, and the higher a load transient response speed. According to formula (2), when the load has the transient step, the greater the duty cycle D, the longer the charging time DT for a load capacitor in a single period, the faster the recovery speed of the output voltage, and the higher the load transient response speed.

FIG. 1 is a schematic circuit diagram illustrating a conventional two-phase series capacitor DC-DC converter according to an embodiment of the present disclosure.

As shown in FIG. 1, for the two-phase series capacitor DC-DC converter, a most direct way to improve a load transient response speed is to increase a switching frequency of the converter. Under a premise of keeping an inductor current ripple unchanged, a smaller filter inductance value is selected to increase a rising slope of an inductor current.

As shown in FIG. 1, for the conventional two-phase series capacitor DC-DC converter, $L_a$, $L_b$, and C are filter inductors and a capacitor, BH, BL, AH, and AL are power switches, and equivalent parasitic capacitances of switch nodes SW1, SW2, and SW3 are $C_{oss1}$, $C_{oss2}$, and $C_{oss3}$, respectively. In an application environment with a high conversion ratio, a power supply voltage is relatively high, and LDMOSFETs (Laterally-Diffused Metal-Oxide Semiconductor Field Effect Transistor) are often used as power switches, resulting in large parasitic capacitances $C_{oss1}$, $C_{oss2}$ and $C_{oss3}$ at the switch nodes SW1, SW2 and SW3. When BH, BL, AH and AL are switched, the electrical charges on the capacitors $C_{oss1}$, $C_{oss2}$ and $C_{oss3}$ are discharged and wasted, and energy loss may be $C_{oss1}V_{in}^2 fs + C_{oss2}V_{in}^2 fs + C_{oss3}V_{in}^2 fs$. Therefore, a higher switching frequency fs brings greater switching loss and seriously reduces energy conversion efficiency. The high conversion ratio means that a voltage difference between an input voltage and an output voltage of the DC-DC converter is large, for example, the input voltage is 48V and the output voltage is 1V.

Figure 2:
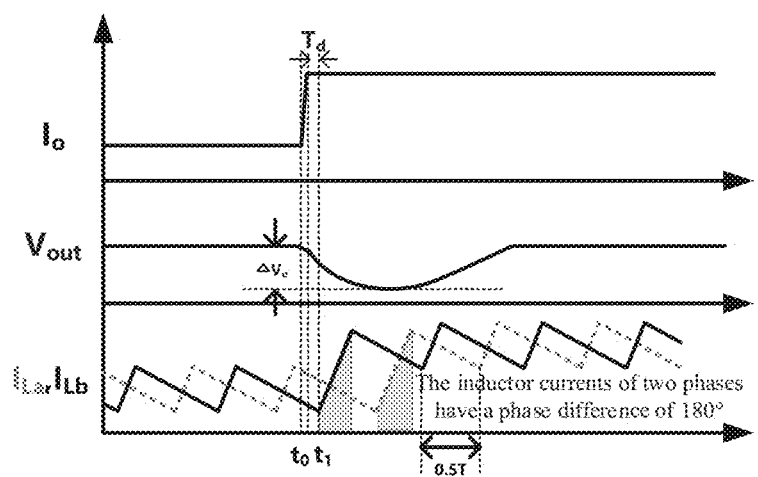
FIG. 2 shows a diagram of transient response curves related to a load step of a conventional two-phase series capacitor DC-DC converter.

FIG. 2 shows a diagram of transient response curves related to a load step of a conventional two-phase series capacitor DC-DC converter according to an embodiment of the present disclosure.

As shown in FIG. 2, for the two-phase series capacitor DC-DC converter, due to an inherent 180° phase difference of the two-phase structure, inductors in the two phase branches are prevented from charging a load at the same time, so there is room for optimization of a load transient response speed.

Embodiments of the present disclosure provide DC-DC converters with fast load transient response, which achieve fast load transient response without increasing the switching frequency. The provided DC-DC converter has a simple circuit with lower costs. Moreover, the circuit may be applied in a topology of multiphase series capacitor DC-DC converter, and has scalability.

Figure 3:
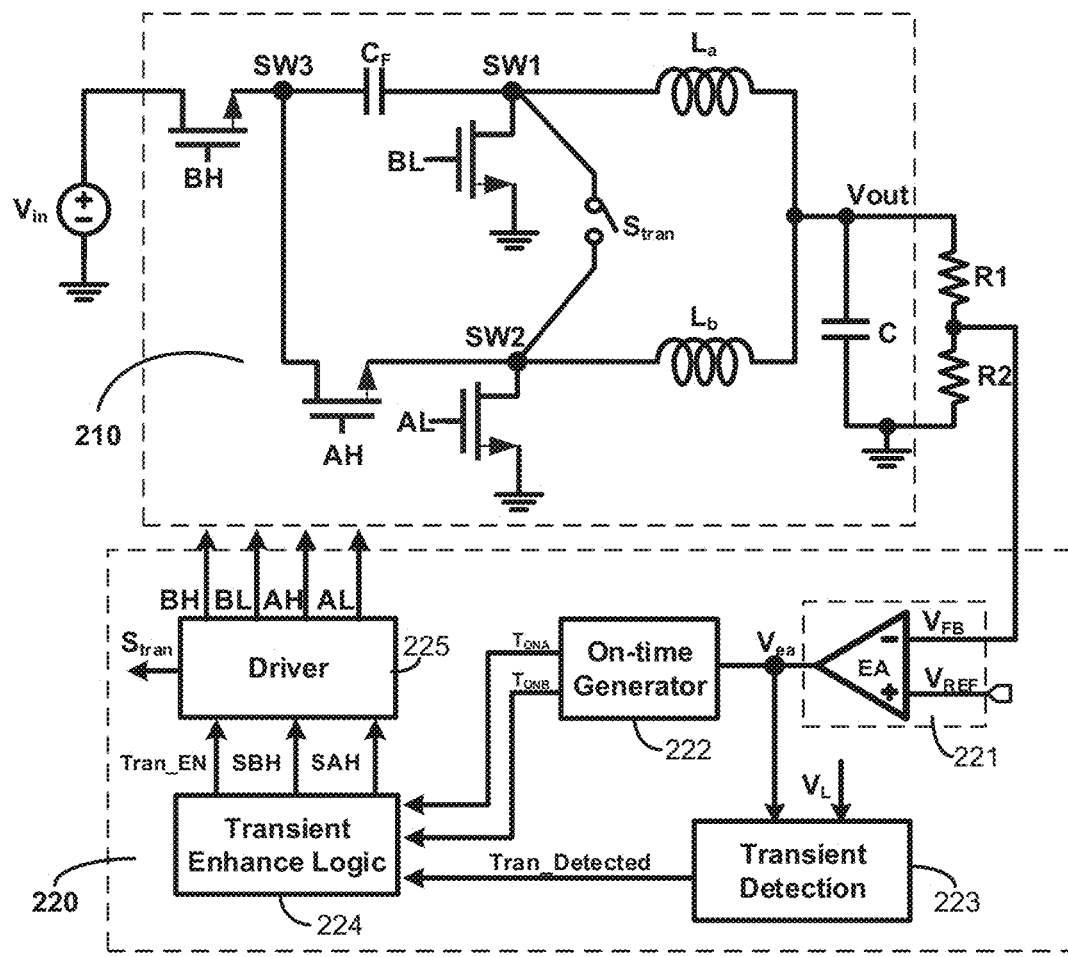
FIG. 3 is a schematic circuit diagram illustrating a multiphase series capacitor DC-DC converter according to an embodiment of the present disclosure.

FIG. 3 is a schematic circuit diagram illustrating a multiphase series capacitor DC-DC converter according to an embodiment of the present disclosure.

It should be noted that the present disclosure provides a multiphase series capacitor DC-DC converter. For ease of illustration, FIG. 3 only shows a multiphase series capacitor DC-DC converter with two phases.

As shown in FIG. 3, the DC-DC converter may include two parts: a power stage circuit 210 and a load transient response circuit 220.

The power stage circuit 210 is configured to convert an input DC voltage into a stable output DC voltage with ripple, where the power stage circuit 210 includes inductors of at least two phases, and there is a phase difference with a preset interval between inductor currents of the phases for alternately charging a load in sequence. For example, when the power stage circuit 210 includes only two-phase inductors, the phase difference between inductor currents of the two phases is 180°, and when the power stage circuit 210 includes three-phase inductors, the phase difference between inductor currents of two of the three phases is 120°. There is a bidirectional switch $S_{tran}$ provided between inductors of every two adjacent phases. When the bidirectional switch $S_{tran}$ is turned on, two-phase inductors connected with the turned-on bidirectional switch $S_{tran}$ are connected in parallel, and the corresponding two-phase inductors charge the load at the same time.

The load transient response circuit 220 is configured to control at least one of bidirectional switches $S_{tran}$ to be turned on when a load transient positive step occurs, so that at least corresponding two-phase inductors charge the load at the same time, so as to fast respond to a transient change of the load.

As shown in FIG. 3, the power stage circuit 210 includes four power switches AH, AL, BH and BL, a flying capacitor $C_F$ and two filter inductors $L_a$ and $L_b$. In particular, the circuit further includes a bidirectional switch $S_{tran}$ connected in parallel between two switch nodes SW1 and SW2. The bidirectional switch $S_{tran}$ may be formed by connecting two N-type LDMOSFETs together in a source terminals connected manner. When a gate-source voltage is at a high voltage level, both switches (i.e., the two LDMOSFETs) are turned on, and at this time, both switches are in an ON (conduction) state; when the gate-source voltage is at a low voltage level, both switches (i.e., the two LDMOSFETs) are turned off, and at least one N-type LDMOSFET's body diode is in reverse bias, which can ensure that the bidirectional switch $S_{tran}$ is in an off state. The present disclosure does not limit a switch type of the bidirectional switch $S_{tran}$.

Specifically, a sub-circuit of the power stage circuit where an inductor of at least one phase is located includes: a power switch AH, a power switch AL, and a filter inductor $L_b$, which are connected in sequence. A sub-circuit where an inductor of at least one other phase adjacent to the inductor $L_b$ is located includes: a power switch BH, a capacitor $C_F$, a power switch BL and a filter inductor $L_a$, which are connected in sequence. Input terminals of the power switch AH and the capacitor $C_F$ are both connected to the power switch BH, and the power switches BH and AH are for controlling voltage inputs of corresponding sub-circuits, respectively. Output terminals of the filter inductor $L_b$ and the filter inductor $L_a$ are both connected to an output port of the power stage circuit; and the bidirectional switch $S_{tran}$ is provided between input terminals of the filter inductor $L_b$ and the filter inductor $L_a$. A grounded filter capacitor C is further provided at the output port of the power stage circuit.

Figure 6:
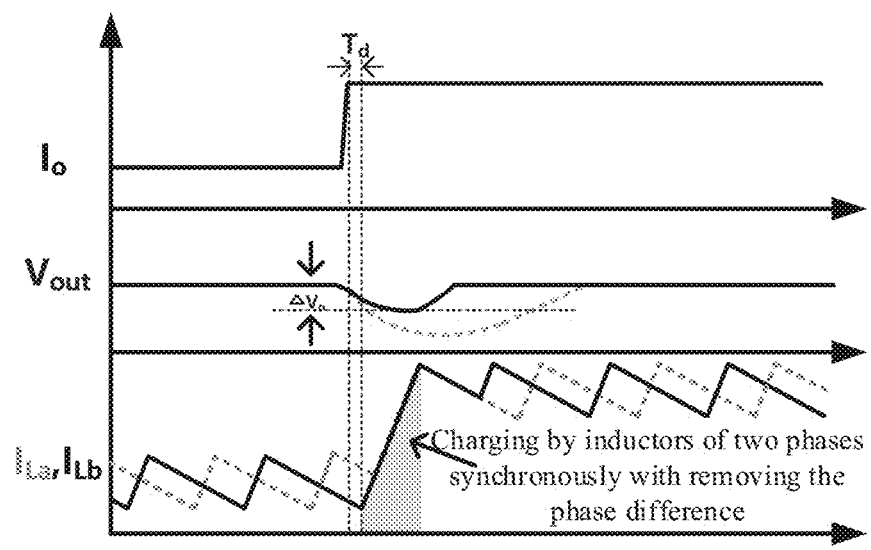
FIG. 6 shows a diagram of transient response curves related to a load step of the multiphase series capacitor DC-DC converter according to an embodiment of the present disclosure.

The bidirectional switch $S_{tran}$ is used to short-circuit the switch nodes of the two phases when the load has a transient change, so as to remove a two-phase interleaved clock, and to use the inductor currents of the two phases to charge the load synchronously. Specific transient response curves related to a load step is shown in FIG. 6.

As shown in FIG. 3, the load transient response circuit 220 includes: an error amplifier 221, an on-time generating circuit 222, a transient detecting circuit 223, a transient enhancement logic circuit 224, and a drive circuit 225.

The error amplifier 221 is configured to calculate an error between an output voltage $V_{FB}$ of the power stage circuit and a reference voltage $V_{REF}$ to obtain an error signal $V_{EA}$.

The on-time generating circuit 222 is configured to generate control signals for high-side power transistors of circuits where the inductors of phases are located according to the error signal $V_{EA}$, and each of the control signals is for controlling the conduction of a circuit in which an inductor of each phase is located, so that the inductor of each phase charges the load alternately in sequence.

The transient detecting circuit 223 is configured to determine whether a transient positive step of the load occurs according to the error signal $V_{EA}$. Specifically, when the error signal $V_{EA}$ is greater than a preset signal $V_L$, it is determined that the load has the transient positive step. When it is determined that the load has the transient positive step, a transient detection signal Tran_Detected is output as, for example, a high voltage level. Otherwise, the output is a low voltage level. When the transient detection signal is at a high voltage level, a built-in monostable circuit is triggered to ensure that the signal may not be triggered to change again within a rated time.

The transient enhancement logic circuit 224 is configured to, when the occurrence of the transient positive step of the load is detected, generate a control signal for controlling the bidirectional switch to be turned on.

The drive circuit 225 is configured to control at least one of the bidirectional switches to be turned on according to the control signal.

The drive circuit 225 is further configured to, after the load transient positive step occurs, turn off the power switches BL, AH, and AL on the two-phase sub-circuits connected with the at least one turned-on bidirectional switch $S_{tran}$, and to drive the power switch BH to generate voltage input pulses in response to the load transient positive step.

The drive circuit 225 is further configured to, when no load transient positive step occurs, control the power switches provided on the circuits where the inductors of phases are located to be turned-on and turned-off according to the control signals of the power transistors on the circuits where the inductors of phases are located. That is, the drive circuit 225 controls the conduction (ON) time of the power switches on the circuits where the inductors of phases are located, so that the inductor of each phase charges the load alternately in sequence.

In the embodiments of the present disclosure, it is ensured that, when the transient positive step of the load is detected, the power transistor BL of a first phase and the power transistors AH and AL of a second phase are turned off, and a control signal for $S_{tran}$ is generated to remove the two-phase interleaved clock.

Furthermore, the drive circuit 225 is further configured to, when no load transient positive step occurs, control the power switches provided on the circuits where the inductors of phases are located, so that the inductors of phases can charge the load alternately in sequence.

Figure 4:
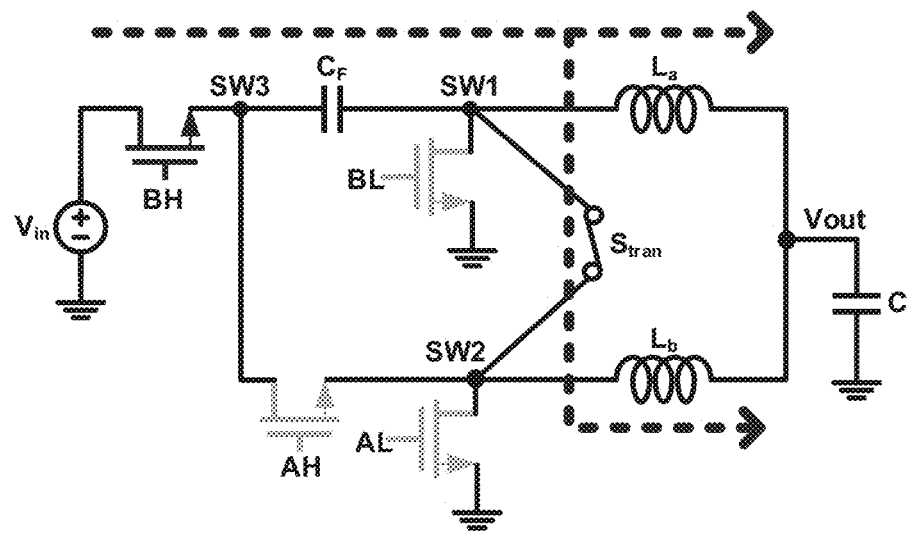
FIG. 4 is a schematic diagram illustrating a working state of a power stage circuit when the load transient step occurs according to an embodiment of the present disclosure.
Figure 5:
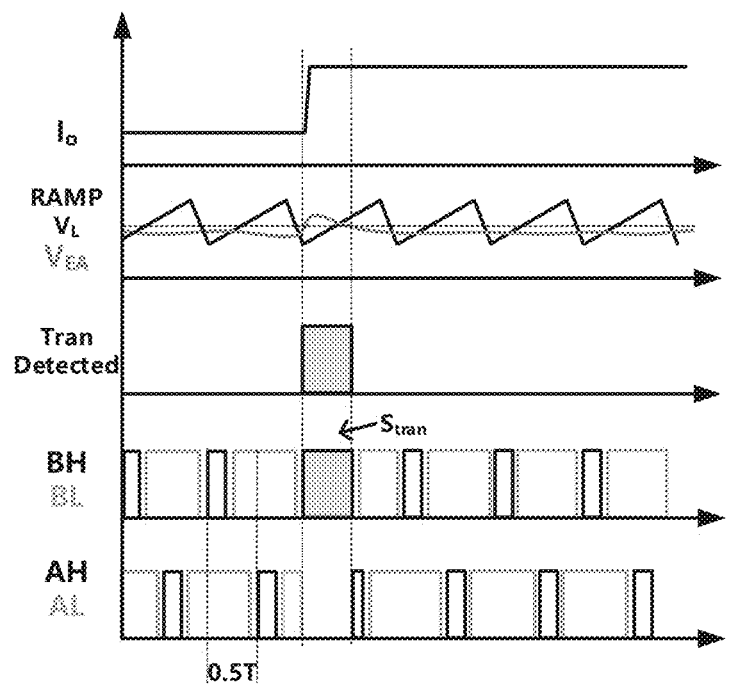
FIG. 5 is a schematic diagram illustrating signals of the multiphase series capacitor DC-DC converter according to an embodiment of the present disclosure.

FIG. 4 is a schematic diagram illustrating a working state of a power stage circuit in response to the load transient step according to an embodiment of the present disclosure. FIG. 5 is a schematic diagram illustrating signals of the multiphase series capacitor DC-DC converter according to an embodiment of the present disclosure. FIG. 6 shows a diagram of transient response curves related to a load step of the multiphase series capacitor DC-DC converter according to an embodiment of the present disclosure.

Please refer to FIGS. 4, 5, and 6. In FIG. 4, the parts in gray color represent the power transistors being turned off. In FIG. 5, BH, BL, AH and AL correspond to gate-terminal control signals of corresponding power transistors in FIG. 4, $S_{tran}$ represents the control signal of the bidirectional switch $S_{tran}$. When the transient detection signal Tran_Detected is at a high voltage level, both a control signal SBH of the power transistor BH of the first phase and a control signal Tran_EN of the bidirectional switch $S_{tran}$ are set to a high voltage level, and a control signal SAH of the second phase is set to a low voltage level. In this way, the gate-terminal control signals of the power transistors of each phase and the gate-terminal control signal of the bidirectional switch $S_{tran}$ based on the signal Tran_EN, which are used to turn off the power transistors AH, AL and BL, and turn on the power transistor BH and the bidirectional switch $S_{tran}$. Referring to FIG. 6, when the bidirectional switch $S_{tran}$ is turned on, the two-phase inductors are used to charge the load at the same time, an existing delay caused by the two-phase interleaved clock is removed, and a load transient response speed is improved. Referring to FIG. 5, conduction time of the power transistor BH of the first phase is extended in response to the control signal SBH, so as to respond to the transient change of the load and provide corresponding energy for the load.

In the embodiments of the present disclosure, during the load transient positive step, the inductors of two phases may charge the load capacitor at the same time, which is equivalent to the two-phase inductors being connected in parallel, and a rising slope of the inductor current is expressed by formula (3):

$$\frac{di_L}{dt} = \frac{(0.5V_{in} - V_o)}{L/2} = \frac{V_{in}}{L}(1 - D) \qquad (3)$$

where D represents a duty cycle of the power transistor BH in a stable state.

For a conventional two-phase series capacitor DC-DC converter, during the load transient positive step, a rising slope of the inductor current is expressed by formula (4):

$$\frac{di_L}{dt} = \frac{(0.5V_{in} - V_o)}{L} = \frac{V_{in}}{2L}(1 - D) \qquad (4)$$

According to formulas (3) and (4), it can be seen that a multiphase series capacitor DC-DC converter provided by the present disclosure removes the two-phase interleaved clock when a load transient positive step occurs, and uses inductors of two phases to charge the load at the same time, which makes a rising slope of an inductor current is doubled, so that it has fast load transient response capability. In this way, in the case that the converter is an N-phase series capacitor DC-DC converter, when the load has a transient step, N-phase inductors can be used to charge the load at the same time, which makes the rising slope of the inductor current steepen to N times. The N-phase series capacitor DC-DC converter has fast load transient response capability, wide application range and scalability.

Figure 7:
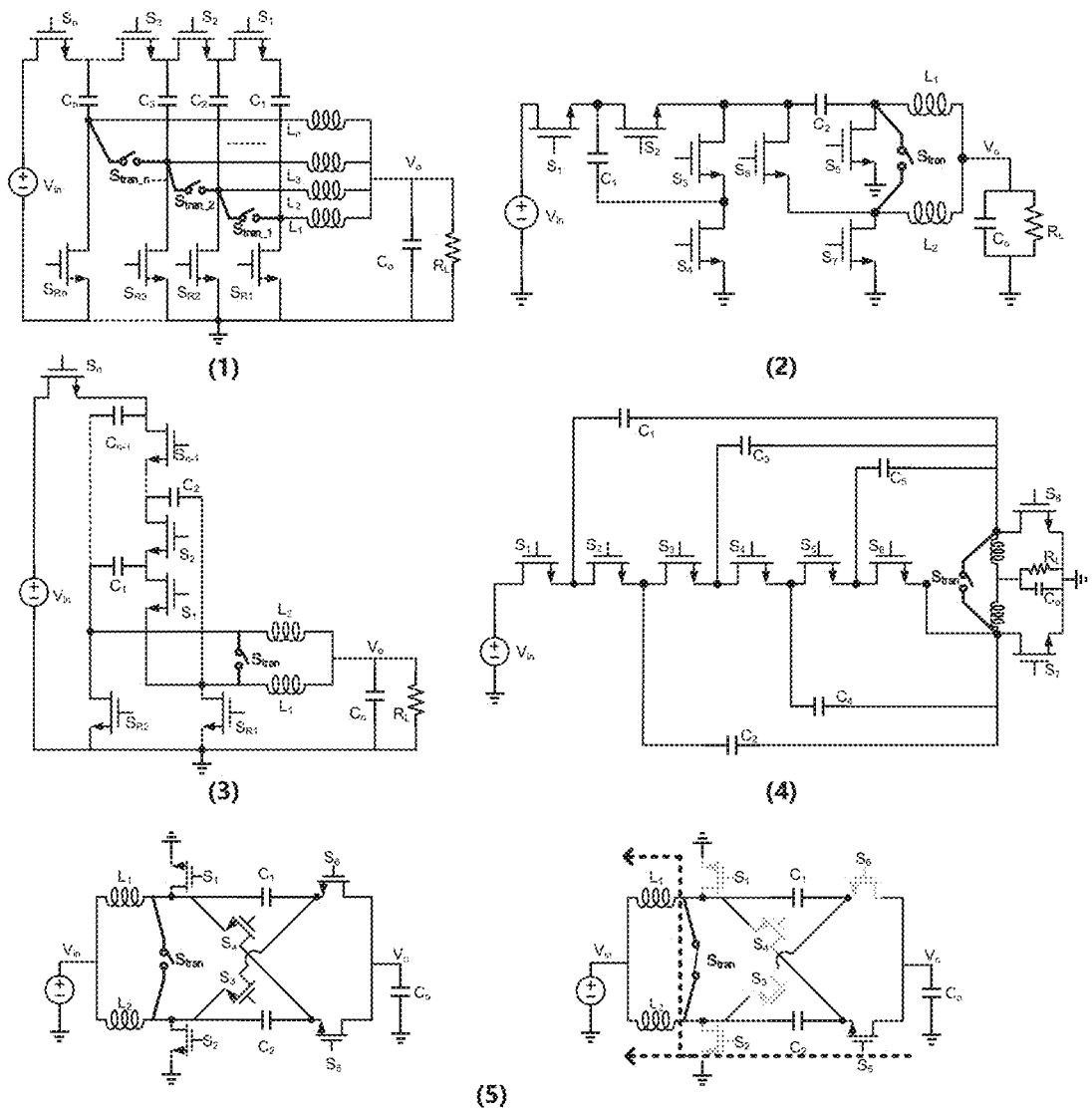
FIG. 7 is a schematic diagram illustrating a topology structure of a power stage circuit of the multiphase series capacitor DC-DC converter according to an embodiment of the present disclosure.

FIG. 7 is a schematic diagram illustrating a topology structure of a power stage circuit according to an embodiment of the present disclosure.

As shown in FIG. 7, embodiments of the present disclosure also provide several kinds of topology structures of the power stage circuit, where (1) shows a multiphase series capacitor topology, (2) schematically shows a series capacitor+3-level hybrid topology, (3) schematically shows a simplified multiphase series capacitor topology, and (4) schematically shows a dual-inductor hybrid Dickson topology. The topology structure of the power stage circuit provided in embodiments of the present disclosure is not limited to the several structures shown in FIG. 7, only if all of them may realize that, by turning on one or more bidirectional switches, part or all of inductors of multiple phases can charge a load at the same time, so as to respond to a load transient change fast.

The topology of the multiphase series capacitor DC-DC converter provided by the present disclosure may be a step-up or step-down multiphase series capacitor power stage circuit. In the case that the power stage circuit has a step-up multiphase series capacitor topology shown as (5) in FIG. 7, the multiphase series capacitor DC-DC converter provided by the present disclosure remove a multi-phase interleaved clock when a load has a transient negative step, and uses two or more inductors of multiple phases to discharge the load at the same time, which makes a falling slope of an inductor current steepen to double or more times, so that it has fast load transient response capability.

Figure 8:
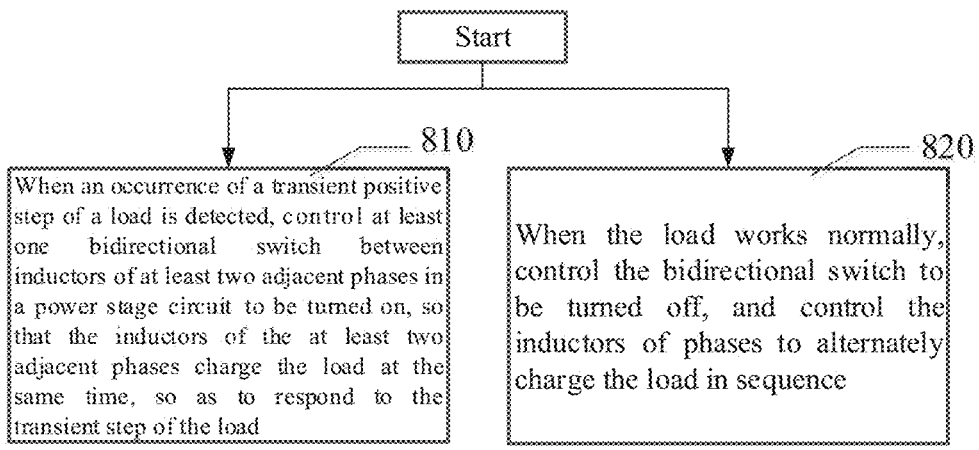
FIG. 8 shows a flowchart of a control method for the multiphase series capacitor DC-DC converter according to an embodiment of the present disclosure.

FIG. 8 shows a flowchart of a control method for the multiphase series capacitor DC-DC converter according to an embodiment of the present disclosure.

As shown in FIG. 8, the control method may include S810.

At S810, when an occurrence of a transient positive step of a load is detected, at least one bidirectional switch between inductors of at least two adjacent phases in a power stage circuit is controlled to be turned on, so that the inductors of the at least two adjacent phases charge the load at the same time, so as to respond to the transient step of the load.

In embodiments of the present disclosure, in response to the transient positive step of the load, at least one bidirectional switch in a power circuit of a converter shown in FIG. 3 can be controlled to be turned on, so that inductors of at least two phases can charge the load at the same time to improve a response speed by at least 100%.

Specifically, when the load occurring the transient positive step is detected, S810 may further include:

at S811, the power switches BL, AH and AL located on sub-circuits of two phases connected with the at least one turned-on bidirectional switch in the power stage circuit are turned off, and the power switch BH is driven to generate voltage input pulses in response to the load transient positive step.

In S810, when the load occurring the transient positive step is detected, controlling the bidirectional switch between inductors of the at least two adjacent phases in the power stage circuit to be turned on may include S812 to S815.

At S812, an error signal is obtained by calculating an error between an output voltage of the power stage circuit and a reference voltage.

At S813, whether the transient positive step of the load is occurred is determined according to the error signal.

When the error signal exceeds a rated amplitude VL, it is determined that the transient positive step of a load current occurs, and the transient detection signal Tran_Detected is output as a high voltage level, if the error signal does not exceed the rated amplitude VL, it is determined that no transient positive step of the load current occurs, and the transient detection signal Tran_Detected is output as a low voltage level.

At S814, when the occurrence of the transient positive step of the load is determined, at least one control signal for controlling the at least one bidirectional switch to be turned on is generated.

At S815, the at least one bidirectional switch is controlled to be turned on according to the at least one control signal.

When the transient detection signal Tran_Detected is at a high voltage level, a power transistor BL of a first phase and two power transistors AH and AL of a second phase are all turned off, the bidirectional switch $S_{tran}$ is triggered to be turned on, and two phase inductor currents are used to charge the load at the same time to achieve transient enhancement effect.

The method may further include S820.

At S820, when the load works normally, the bidirectional switch is controlled to be turned off, and the inductors of phases are controlled to alternately charge the load in sequence.

After the transient positive step of the load occurs and then returns to normal, the drive circuit 225 in FIG. 3 may control the bidirectional switch to be turned off, power switches BL, BH, AH and AL are controlled by two-phase control signals SBH and SAH to be turned on in sequence, a phase difference between inductor currents of each phase is restored, and the load is charged alternately in sequence.

Those skilled in the art can understand that the features recorded in various embodiments and/or claims of the present disclosure can be combined or integrated in multiple ways, even if such combinations or integrations are not explicitly recorded in the present disclosure. In particular, without departing from the spirit and teachings of the present disclosure, the features recorded in various embodiments and/or claims of the present disclosure may be combined and/or integrated in various ways. All such combinations and/or integrations fall within the scope of the present disclosure.

Although the present disclosure has been illustrated and described with reference to specific and illustrative embodiments of the present disclosure, those skilled in the art should understand that various changes in form and details can be made to the present disclosure without departing from the spirit and scope of the disclosure limited by the accompanying claims and their equivalents. Therefore, the scope of the present disclosure should not be limited to the above embodiments, and should be determined not only by the accompanying claims, but also by the equivalents of the accompanying claims.

The invention claimed is:

1. A multiphase series capacitor direct current to direct current (DC-DC) converter, comprising:
   a power stage circuit configured to convert an input direct-current (DC) voltage into a stable DC voltage required by a load, wherein the power stage circuit comprises inductors of two or more phases, and there is a phase difference with a preset interval between inductor currents of phases for alternately charging the load in sequence, and a bidirectional switch is provided between inductors of every two adjacent phases, wherein when the bidirectional switch is turned on, the inductors of the corresponding two phases charge the load at the same time; and
   a load transient response circuit configured to, when a load transient positive step occurs, control one or more bidirectional switches to be turned on to make inductors of two or more corresponding phases charge the load at the same time.

2. The converter according to claim 1, wherein the load transient response circuit comprises:
   an error amplifier configured to calculate an error between an output voltage of the power stage circuit and a reference voltage to obtain an error signal;
   a transient detecting circuit configured to determine whether the load transient positive step occurs based on the error signal;
   a transient enhancement logic circuit configured to, when the occurrence of the load transient positive step is detected, generate one or more first control signals for controlling the one or more bidirectional switches to be turned on; and a drive circuit configured to control the one or more bidirectional switches to be turned on based on the one or more first control signals.

3. The converter according to claim 2, wherein when the load transient positive step occurs, inductors of two phases connected with the one or more turned-on bidirectional switches are connected in parallel after the one or more bidirectional switches are turned on.

4. The converter according to claim 2, wherein the load transient response circuit further comprises:

an on-time generating circuit configured to generate second control signals for power transistors on circuits where the inductors of phases are located based on the error signal, wherein each of the second control signals is for controlling conduction of a circuit where the inductor of each phase is located to make the inductor of each phase charges the load alternately in sequence;

wherein the drive circuit is further configured to, when no load transient positive step occurs, control power switches provided on the circuits where the inductors of phases are located to be turned-on and turned-off according to the second control signals of phases, to make the inductor of each phase charge the load alternately in sequence.

5. The converter according to claim 1, wherein the power stage circuit comprises:

a sub-circuit where a first inductor of at least one phase is located comprising:

a power switch AH, a power switch AL and a filter inductor $L_b$, which are connected in sequence; and a sub-circuit where a second inductor of at least one other phase adjacent to the first inductor is located comprising:

a power switch BH, a capacitor $C_F$, a power switch BL and a filter inductor $L_a$, which are connected in sequence, wherein input terminals of the power switch AH and the capacitor $C_F$ are both connected to the power switch BH, the power switches BH and AH are for controlling voltage inputs of corresponding sub-circuits, respectively; output terminals of the filter inductor $L_b$ and the filter inductor $L_a$ are both connected to an output port of the power stage circuit; the bidirectional switch is provided between input terminals of the filter inductor $L_b$ and the filter inductor $L_a$; and a grounded filter capacitor C is provided at the output port of the power stage circuit.

6. The converter according to claim 5, wherein after the load transient positive step occurs, the drive circuit is further configured to turn off the power switches BL, AH, and AL on two-phase sub-circuits connected with one or more turned-on bidirectional switches, and to drive the power switch BH to generate voltage input pulses in response to the load transient positive step.

7. A control method for a multiphase series capacitor direct current to direct current (DC-DC) converter, applied to the multiphase series capacitor DC-DC converter according to claim 1, comprising:

controlling, when the occurrence of the transient positive step of the load is detected, the one or more bidirectional switches between inductors of two or more adjacent phases in the power stage circuit to be turned on, to make the inductors of the two or more adjacent phases charge the load at the same time.

8. The control method according to claim 7, further comprising:

when the load works normally, controlling the one or more bidirectional switches to be turned off and controlling the inductor of each phase to alternately charge the load in sequence.

9. The control method according to claim 8, wherein when the occurrence of the transient positive step of the load is detected, the method further comprises:

turning off power switches BL, AH and AL located on two-phase sub-circuits connected with the one or more turned-on bidirectional switches in the power stage circuit, and driving a power switch BH to generate voltage input pulses in response to the load transient positive step.

10. The control method according to claim 7, wherein when the occurrence of the transient positive step of the load is detected, controlling the one or more bidirectional switches between the inductors of the two or more adjacent phases in the power stage circuit to be turned on comprises:

obtaining an error signal by calculating an error between an output voltage of the power stage circuit and a reference voltage;

determining whether the load transient positive step occurs based on the error signal;

when the occurrence of the transient positive step of the load is determined, generating one or more first control signals for controlling the one or more bidirectional switches to be turned on; and controlling the one or more bidirectional switches to be turned on based on the one or more first control signals.

* * * * *